US012591808B2

(12) United States Patent
Kingetsu

(10) Patent No.: US 12,591,808 B2
(45) Date of Patent: Mar. 31, 2026

(54) COMPUTER-READABLE RECORDING MEDIUM STORING DETECTION PROGRAM, DETECTION METHOD, AND DETECTION DEVICE

(71) Applicant: FUJITSU LIMITED, Kawasaki (JP)

(72) Inventor: Hiroaki Kingetsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 589 days.

(21) Appl. No.: 18/187,740

(22) Filed: Mar. 22, 2023

(65) Prior Publication Data

US 2023/0222392 A1    Jul. 13, 2023

Related U.S. Application Data

(63) Continuation of application No. PCT/JP2020/039191, filed on Oct. 16, 2020.

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2013/0262368 A1    10/2013    Wolff et al.
2017/0330109 A1    11/2017    Maughan et al.

2018/0121815 A1    5/2018    Lamparter et al.
2019/0279039 A1    9/2019    Umeda
2021/0224314 A1*   7/2021    Diaz Garcia ........ G06V 10/764
(Continued)

FOREIGN PATENT DOCUMENTS

JP    2018-513490 A    5/2018
JP    2019-159576 A    9/2019

OTHER PUBLICATIONS

Ashkan Shabbak et al., "An Improvement of the Hotelling T2 Statistic in Monitoring Multivariate Quality Characteristics", Hindawi Publishing Corporation, Mathematical Problems in Engineering, vol. 2012, Article ID 531864, pp. 1-15, 2012, doi:10.1155/2012/531864 (Total 16 pages).

(Continued)

*Primary Examiner* — Maryam A Nasri
(74) *Attorney, Agent, or Firm* — Fujitsu Intellectual Property Center

(57) ABSTRACT

A non-transitory computer-readable recording medium stores a detection program for causing a computer to execute processing including: inputting a plurality of pieces of second data into a second machine learning model generated by machine learning based on a plurality of pieces of first data and a first result output from a first machine learning model according to an input of the plurality of pieces of first data; acquiring a second result output from the second machine learning model according to the input of the plurality of pieces of second data; and detecting a difference between a distribution of the plurality of pieces of first data and a distribution of the plurality of pieces of second data, based on comparison between a value calculated based on the second result and a gradient of a loss function of the second machine learning model with a threshold.

18 Claims, 21 Drawing Sheets

(56) References Cited

U.S. PATENT DOCUMENTS

2021/0279866 A1* 9/2021 Svekolkin ................ G06T 7/11

OTHER PUBLICATIONS

Victor Cerqueira et al., "Unsupervised Concept Drift Detection Using a Student-Teacher Approach", Lecture Norts in Computer Science, Book Series (LNCS, vol. 12323), pp. 190-204, Oct. 15, 2020 (Total 17 pages) (Cited in ISR).

Jie Lu et al., "Learning Under Concept Drift: A Review", IEEE Transactions on Knowledge and Data Engineering, vol. 31, No. 12, pp. 2346-2363, Dec. 2019 (Total 18 pages) (Cited in ISR).

Tsutomu Ishida et al., "Evaluation of Concept Drift Detection Methods for Unlabeled Data in Operation", Proceedings of 34th Annual Conference of the Japanese Society for Artificial Intelligence (JSAI), 2020, pp. 1-4, Jun. 2020 (Total 6 pages) (Cited in ISR).

Asuka Ishii et al., "Study on Optimization of Temperature Parameters in Knowledge Distillation (Examination of Optimization of Temperature Parameters in Knowledge Distillation)", 2019 Information Processing Society of Japan (IPSJ) SIG Technical Report, Computer Vision and Image Media (CVIM), vol. 2019-CVIM-216, No. 10, pp. 1-5, Mar. 8, 2019 (Total 7 pages) (Cited in ISR).

International Search Report and Written Opinion of the International Searching Authority (Form PCT/ISA/210, 220, and 237), mailed in connection with PCT/JP2020/039191 and mailed Dec. 15, 2020 (Total 12 pages).

* cited by examiner

CASE 1

CASE 2

FIG. 6
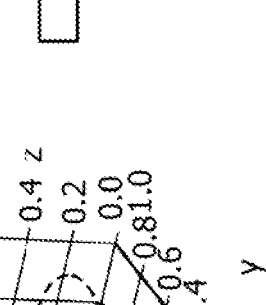
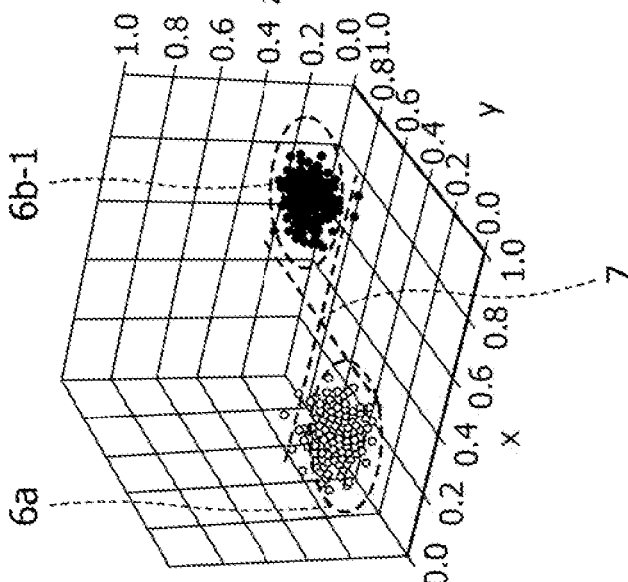

| RECORD NUMBER | TRAINING DATA | CORRECT ANSWER LABEL |
|---|---|---|
| 1001 | RECORD NUMBER "1001" TRAINING DATA | FIRST CLASS |
| 1002 | RECORD NUMBER "1002" TRAINING DATA | FIRST CLASS |
| 1003 | RECORD NUMBER "1003" TRAINING DATA | FIRST CLASS |
| . . . | . . . | . . . |
| 1050 | RECORD NUMBER "1050" TRAINING DATA | SECOND CLASS |
| 1051 | RECORD NUMBER "1051" TRAINING DATA | SECOND CLASS |
| . . . | . . . | . . . |

| SAMPLE NUMBER | PSEUDO SAMPLE |
|---|---|
| pe1001 | PSEUDO SAMPLE OF SAMPLE NUMBER "pe1001" |
| pe1002 | PSEUDO SAMPLE OF SAMPLE NUMBER "pe1002" |
| pe1003 | PSEUDO SAMPLE OF SAMPLE NUMBER "pe1003" |
| ... | ... |
| pe1050 | PSEUDO SAMPLE OF SAMPLE NUMBER "pe1050" |
| pe1051 | PSEUDO SAMPLE OF SAMPLE NUMBER "pe1051" |
| ... | ... |

| SAMPLE NUMBER | PSEUDO SAMPLE | SOFT TARGET |
|---|---|---|
| pe1001 | PSEUDO SAMPLE OF SAMPLE NUMBER "pe1001" | OUTPUT RESULT WHEN PSEUDO SAMPLE OF SAMPLE NUMBER "pe1001" IS INPUT INTO OPERATION MODEL |
| pe1002 | PSEUDO SAMPLE OF SAMPLE NUMBER "pe1002" | OUTPUT RESULT WHEN PSEUDO SAMPLE OF SAMPLE NUMBER "pe1002" IS INPUT INTO OPERATION MODEL |
| pe1003 | PSEUDO SAMPLE OF SAMPLE NUMBER "pe1003" | OUTPUT RESULT WHEN PSEUDO SAMPLE OF SAMPLE NUMBER "pe1003" IS INPUT INTO OPERATION MODEL |
| ... | ... | ... |
| pe1050 | PSEUDO SAMPLE OF SAMPLE NUMBER "pe1050" | OUTPUT RESULT WHEN PSEUDO SAMPLE OF SAMPLE NUMBER "pe1050" IS INPUT INTO OPERATION MODEL |
| pe1051 | PSEUDO SAMPLE OF SAMPLE NUMBER "pe1051" | OUTPUT RESULT WHEN PSEUDO SAMPLE OF SAMPLE NUMBER "pe1051" IS INPUT INTO OPERATION MODEL |
| ... | ... | ... |

| DATA IDENTIFICATION INFORMATION | OPERATION DATASET |
|---|---|
| C0 | OPERATION DATASET WITH DATA IDENTIFICATION INFORMATION "C0" |
| C1 | OPERATION DATASET WITH DATA IDENTIFICATION INFORMATION "C1" |
| C2 | OPERATION DATASET WITH DATA IDENTIFICATION INFORMATION "C2" |
| C3 | OPERATION DATASET WITH DATA IDENTIFICATION INFORMATION "C3" |

COMPUTER-READABLE RECORDING MEDIUM STORING DETECTION PROGRAM, DETECTION METHOD, AND DETECTION DEVICE

CROSS-REFERENCE TO RELATED APPLICATION

This application is a continuation application of International Application PCT/JP2020/039191 filed on Oct. 16, 2020 and designated the U.S., the entire contents of which are incorporated herein by reference.

FIELD

The embodiment discussed herein is related to a detection program or the like that detects accuracy deterioration of a machine learning model in operation.

BACKGROUND

In recent years, the introduction of machine learning models having data determination functions, classification functions, or the like into information systems used by companies or the like has been progressing. Hereinafter, the information system is referred to as a "system". Since the machine learning model performs determination and classification according to training data that has been trained at the time of system development, accuracy of the machine learning model deteriorates if a tendency of input data changes during system operation.

A. Shabbak and H. Midi, "An Improvement of the Hotelling Statistic in Monitoring Multivariate Quality Characteristics", Mathematical Problems in Engineering (2012) 1-15. is disclosed as related art.

SUMMARY

According to an aspect of the embodiments, a nontransitory computer-readable recording medium stores a detection program for causing a computer to execute processing including: inputting a plurality of pieces of second data into a second machine learning model generated by machine learning based on a plurality of pieces of first data and a first result output from a first machine learning model according to an input of the plurality of pieces of first data; acquiring a second result output from the second machine learning model according to the input of the plurality of pieces of second data; and detecting a difference between a distribution of the plurality of pieces of first data and a distribution of the plurality of pieces of second data, based on comparison between a value calculated based on the second result and a gradient of a loss function of the second machine learning model with a threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram for explaining a problem of a statistical test;
FIG. 7 is a diagram for explaining processing of a detection device according to the present embodiment;
FIG. 10 is a diagram illustrating an example of a data structure of a training dataset;
FIG. 12 is a diagram illustrating an example of a data structure of a pseudo sample table;
FIG. 13 is a diagram illustrating an example of a data structure of a distillation data table;
FIG. 14 is a diagram illustrating an example of a data structure of an operation dataset table.

DESCRIPTION OF EMBODIMENTS

Figure 21:
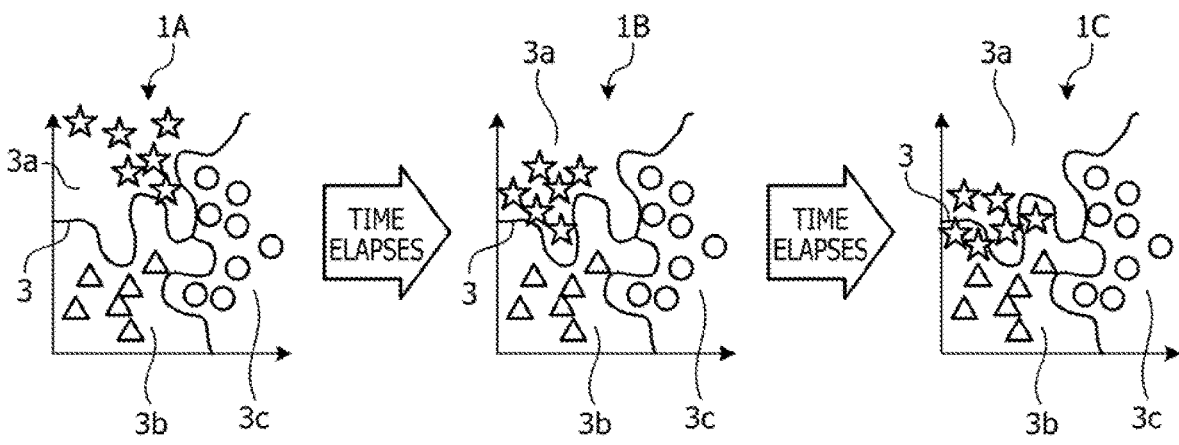
FIG. 21 is a diagram for explaining deterioration of a machine learning model due to changes in a tendency of input data.

FIG. 21 is a diagram for explaining deterioration of a machine learning model due to the change in the tendency of the input data. It is assumed that the machine learning model described here be a model that classifies the input data into one of a first class, a second class, and a third class and be pre-trained based on the training data before the system operation.

In FIG. 21, a distribution 1A illustrates a distribution of input data at the initial stage of the system operation. A distribution 1B illustrates a distribution of input data at the time point when T1 hours have passed since the initial stage of the system operation. A distribution 1C illustrates a distribution of input data at the time point when T2 hours have further passed since the initial stage of the system operation. It is assumed that the tendency (feature amount or the like) of the input data change with time. For example, if the input data is an image, the tendency of the input data changes depending on seasons and time periods even in images in which the same subject is imaged.

A decision boundary 3 indicates a boundary between model application areas 3a to 3c. For example, the model application area 3a is an area in which training data belonging to the first class is distributed. The model application area 3*b* is an area in which training data belonging to the second class is distributed. The model application area 3*c* is an area in which training data belonging to the third class is distributed.

The star mark represents the input data belonging to the first class, for which it is correct to be classified into the model application area 3*a* when input to the machine learning model. The triangle mark represents the input data belonging to the second class, for which it is correct to be classified into the model application area 3*b* when input to the machine learning model. The circle mark represents the input data belonging to the third class, for which it is correct to be classified into the model application area 3*c* when input to the machine learning model.

In the distribution 1A, all pieces of the input data are distributed in normal model application areas. For example, the input data with the star marks is located in the model application area 3*a*, the input data with the triangle marks is located in the model application area 3*b*, and the input data with the circle marks is located in the model application area 3*c*.

In the distribution 1B, since the tendency of the input data has changed, all pieces of the input data are distributed in the normal model application areas. However, the distribution of the input data with the star marks has changed in the direction of the model application area 3*b*.

In the distribution 1C, the tendency of the input data has further changed, and a part of the input data with the star marks has moved across the decision boundary 3 to the model application area 3*b* and is no longer properly classified, which decreases a correct answer rate (deteriorates accuracy of machine learning model).

Here, as a technique for detecting the accuracy deterioration of the machine learning model in operation, there is the related art using T2 statistic (Hotelling's T-square). In this related art, data groups of input data and normal data (training data) are analyzed through principal component analysis, and a T2 statistic of the input data is calculated. The T2 statistic is obtained by summing up squares of distances from the origin of respective standardized principal components to data. The related art detects the accuracy deterioration of the machine learning model based on a change in a distribution of the T2 statistic of the input data group. For example, the T2 statistic of the input data group corresponds to a percentage of outlier data.

However, the above related art has a problem in that it is not possible to detect a change in a distribution of data that is likely to cause accuracy deterioration of a machine learning model.

For example, in high-dimensional (thousands to tens of thousands of dimensions) data that originally has a very large amount of information, most of the information will be lost when the dimensions are reduced through principal component analysis as in the related art. Therefore, even important information (feature amount) used to perform classification or determination disappears, and it is not possible to detect a change in a distribution of data that is likely to cause the accuracy deterioration of the machine learning model.

In one aspect, an object of the embodiment is to provide a detection program, a detection method, and a detection device that can detect a change in a distribution of data that is likely to cause accuracy deterioration of a machine learning model.

Hereinafter, embodiments of a detection program, a detection method, and a detection device disclosed in the present application will be described in detail with reference to the drawings. Note that the present embodiments do not limit the present disclosure.

Before explaining the present embodiments, a reference technique for detecting accuracy deterioration of a machine learning model will be described. In the reference technique, the accuracy deterioration of the machine learning model is detected using a plurality of monitoring tools for which model application areas are narrowed under different conditions. In the following description, the monitoring tool is referred to as an "inspector model".

Figure 1:
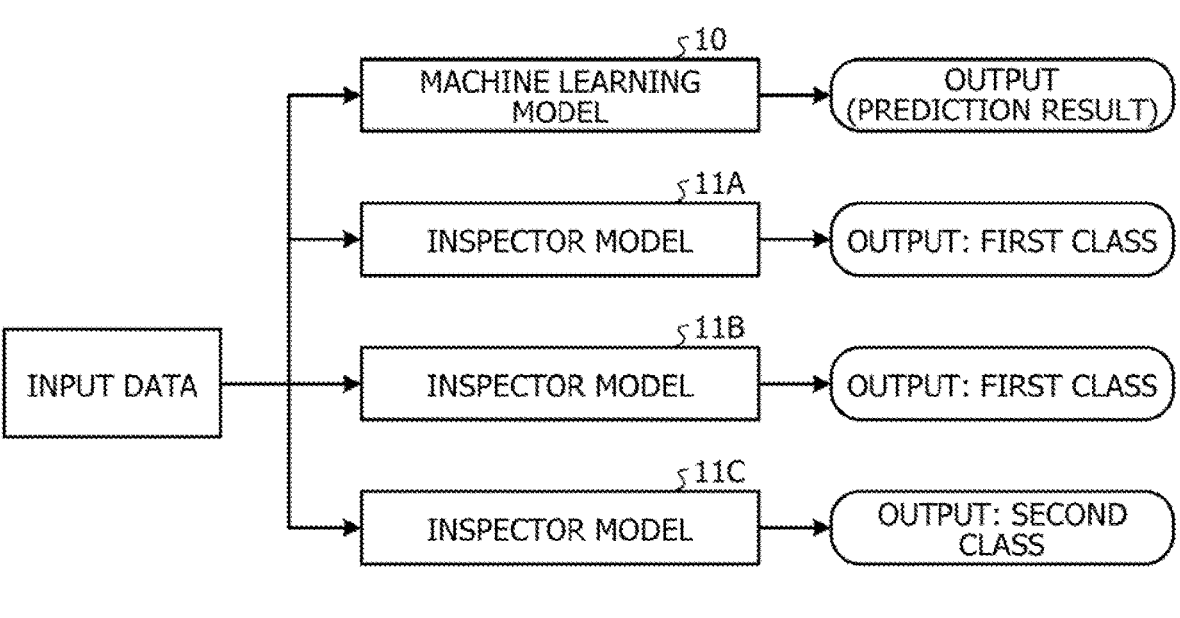
FIG. 1 is a diagram for explaining a reference technique.

FIG. 1 is a diagram for explaining the reference technique. A machine learning model 10 is a machine learning model generated by executing machine learning using training data. In the reference technique, accuracy deterioration of the machine learning model 10 is detected. For example, the training data is used in a case where a parameter of the machine learning model 10 is trained and is associated with a correct answer label.

Inspector models 11A to 11C have model application areas narrowed under respectively different conditions and have different decision boundaries. In the reference technique, the training data is modified in some way, and the inspector models 11A to 11C are trained using the modified training data.

Since the inspector models 11A to 11C have the decision boundaries different from each other, output results differ in some cases even if the same input data is input. In the reference technique, the accuracy deterioration of the machine learning model 10 is detected based on a difference in the output results of the inspector models 11A to 11C. The example illustrated in FIG. 1 illustrates the inspector models 11A to 11C. However, the accuracy deterioration may also be detected using another inspector model. A deep neural network (DNN) is used for the inspector models 11A to 11C.

In the reference technique, in a case where all the output results of the inspector models 11A to 11C are the same, it is determined that the accuracy of the machine learning model 10 is not deteriorated. On the other hand, in the reference technique, in a case where the output results of the inspector models 11A to 11C are different, the accuracy deterioration of the machine learning model 10 is detected.

Figure 2:
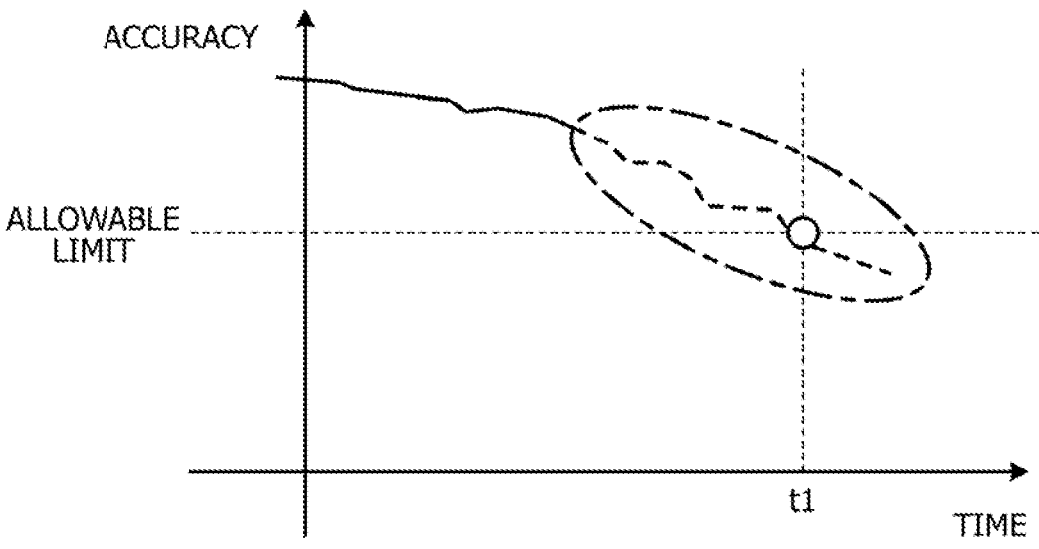
FIG. 2 is a diagram illustrating an example of accuracy deterioration prediction.

FIG. 2 is a diagram illustrating an example of accuracy deterioration prediction. A vertical axis of the graph in FIG. 2 is an axis corresponding to accuracy, and a horizontal axis is an axis corresponding to a time. As illustrated in FIG. 2, the accuracy is lowered with time, and the accuracy falls below an allowable limit at a time t1. For example, with the reference technique, the accuracy deterioration (fall below allowable limit) is detected at the time t1.

Figure 3:
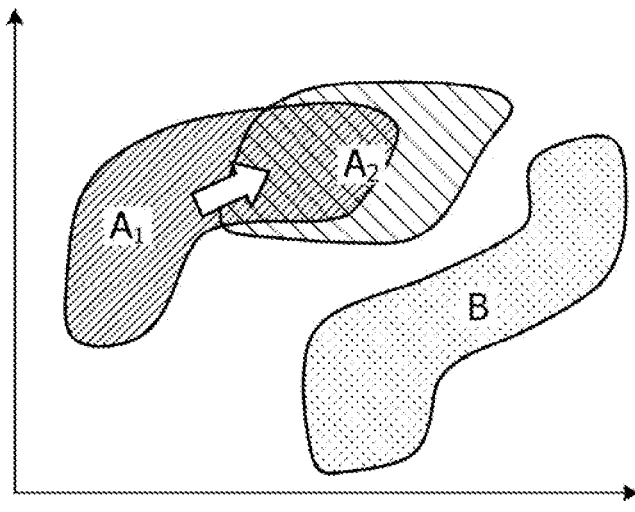
FIG. 3 is a diagram illustrating an example of concept drift.

A change in a distribution (feature amount) of input data with time is referred to as concept drift. FIG. 3 is a diagram illustrating an example of the concept drift. A vertical axis in FIG. 3 is an axis corresponding to a first feature amount, and a horizontal axis is an axis corresponding to a second feature amount. For example, at the time of operation start of the machine learning model 10, a distribution of first data corresponding to a first class is assumed as a distribution $A_1$, and a distribution of second data corresponding to a second class is assumed as a distribution B.

There is a case where the distribution $A_1$ of the first data changes to a distribution $A_2$ with time. Since the original machine learning model 10 performs training using the distribution of the first data as the distribution $A_1$, the accuracy is lowered with time, and retraining is needed.

Data in which the concept drift occurs includes spam emails, electricity demand forecasts, stock price forecasts, poker hand strategy procedures, images, or the like. For example, regarding images, even if a subject is the same, a feature amount of the image differs depending on seasons or time periods.

Here, with the reference technique described above, in order to detect the accuracy deterioration of the machine learning model 10, the plurality of inspector models 11A to 11C is trained. Then, in order to train the plurality of inspector models 11A to 11C, a condition is essential such that the machine learning model 10 and the training data used at the time of training the machine learning model 10 can be modified. For example, it is required that the machine learning model 10 is a specific machine learning model, for example, that the machine learning model 10 is a model that calculates a certainty.

Figure 4:
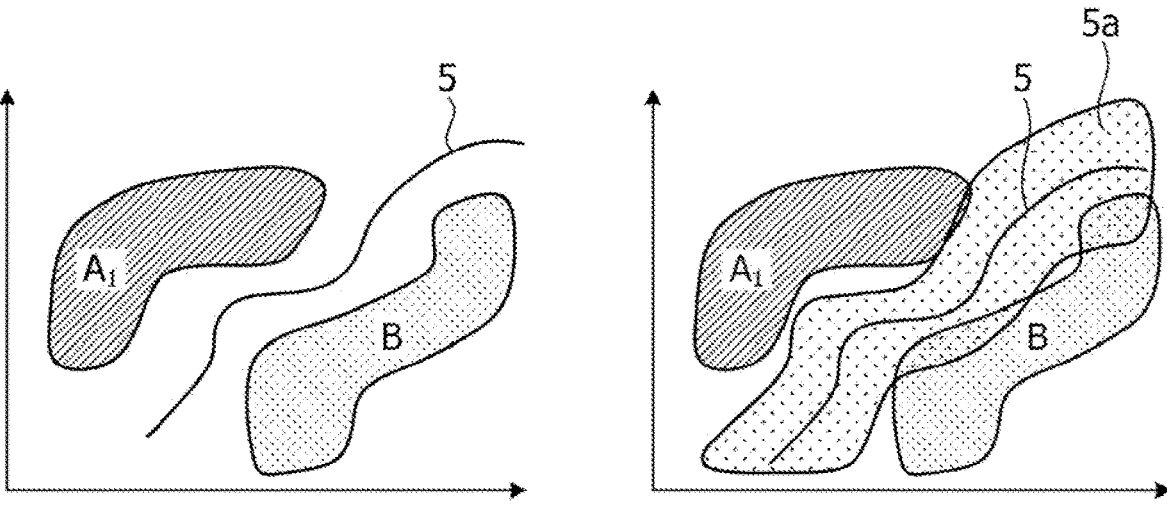
FIG. 4 is a diagram for explaining a basic mechanism of an inspector model.

FIG. 4 is a diagram for explaining a basic mechanism of an inspector model. For example, the inspector model is created by machine learning a decision boundary 5 to be a boundary between the distribution $A_1$ of the training data belonging to the first class and the distribution B of the training data belonging to the second class. In order to detect the accuracy deterioration of the machine learning model 10 for the operation data with time, a dangerous area 5a at the decision boundary 5 is monitored, whether or not the number of pieces of operation data included in the dangerous area 5a is increased (or decreased) is specified, and in a case where the number of pieces of operation data is increased (or decreased), the accuracy deterioration is detected.

Figure 5:
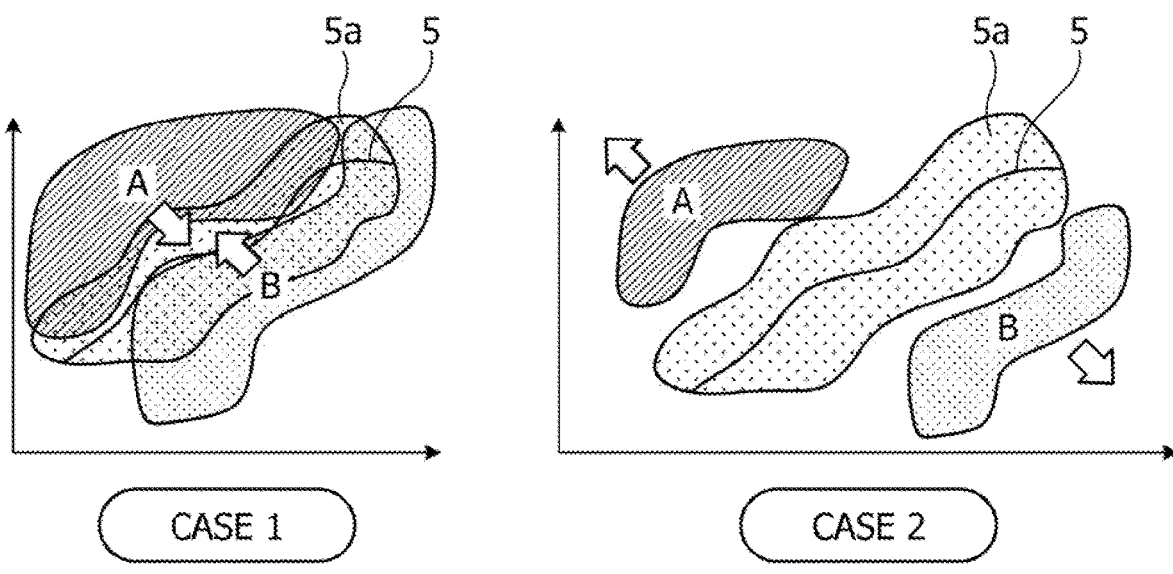
FIG. 5 is a diagram for explaining a problem of the reference technique.

Here, a problem of the reference technique described above will be described. FIG. 5 is a diagram for explaining the problem of the reference technique. For example, using a method for monitoring the dangerous area 5a using the inspector model or the like results in a case 1 or a case 2.

As in the case 1, in a case where the distribution A of the data and the distribution B of the data change to a direction to be closer to each other with time, the number of pieces of data in the dangerous area 5a changes. Therefore, the accuracy deterioration can be detected with the reference technique.

On the other hand, as in the case 2, in a case where the distribution A of the data and the distribution B of the data change in a direction to be separated from each other with time, the number of pieces of data included in the dangerous area 5a does not change. Therefore, the accuracy deterioration cannot be detected with the reference technique.

As in the case 2, in a case where the distribution A of the data is separated from the distribution B of the data, there is a possibility that an answer of the data itself changes. However, even if the inspector model described with reference to the reference technique is used, a result output from each inspector model does not change. For example, if the data is included in the area of the first class, the inspector model classifies the data into the first class no matter how far the data is separated from the decision boundary. In the reference technique, it is implicitly assumed that the answers of the data do not change.

By the way, a shift of the data regardless of the decision boundary can be detected with a statistical test. For example, the statistical test includes Student test, Kolmogorov Smirnov test, a method using a L2 distance, a method using a cosine distance, a method using a Kullback-Leibler (KL) distance, a method using a Wasserstein distance, or the like.

However, when the statistical test is used, all movements of feature amounts (noise) that are not related to classification are detected. Therefore, there is a problem in that a large number of false detections occur. FIG. 6 is a diagram for explaining the problem of the statistical test. In FIG. 6, data groups 6a and 6a-1 positioned in a feature space including the x axe, the y axis, and the z axis are used for description. Here, when a decision boundary 7 is positioned on an xy plane, a change in the z-axis direction has no relation with a classification result. However, when the statistical test is used, a data group 6b-1 moves in the z-axis direction with time, and when the data group 6b-1 is changed to a data group 6b-2, the change is detected, and this results in false detection.

Figure 7:
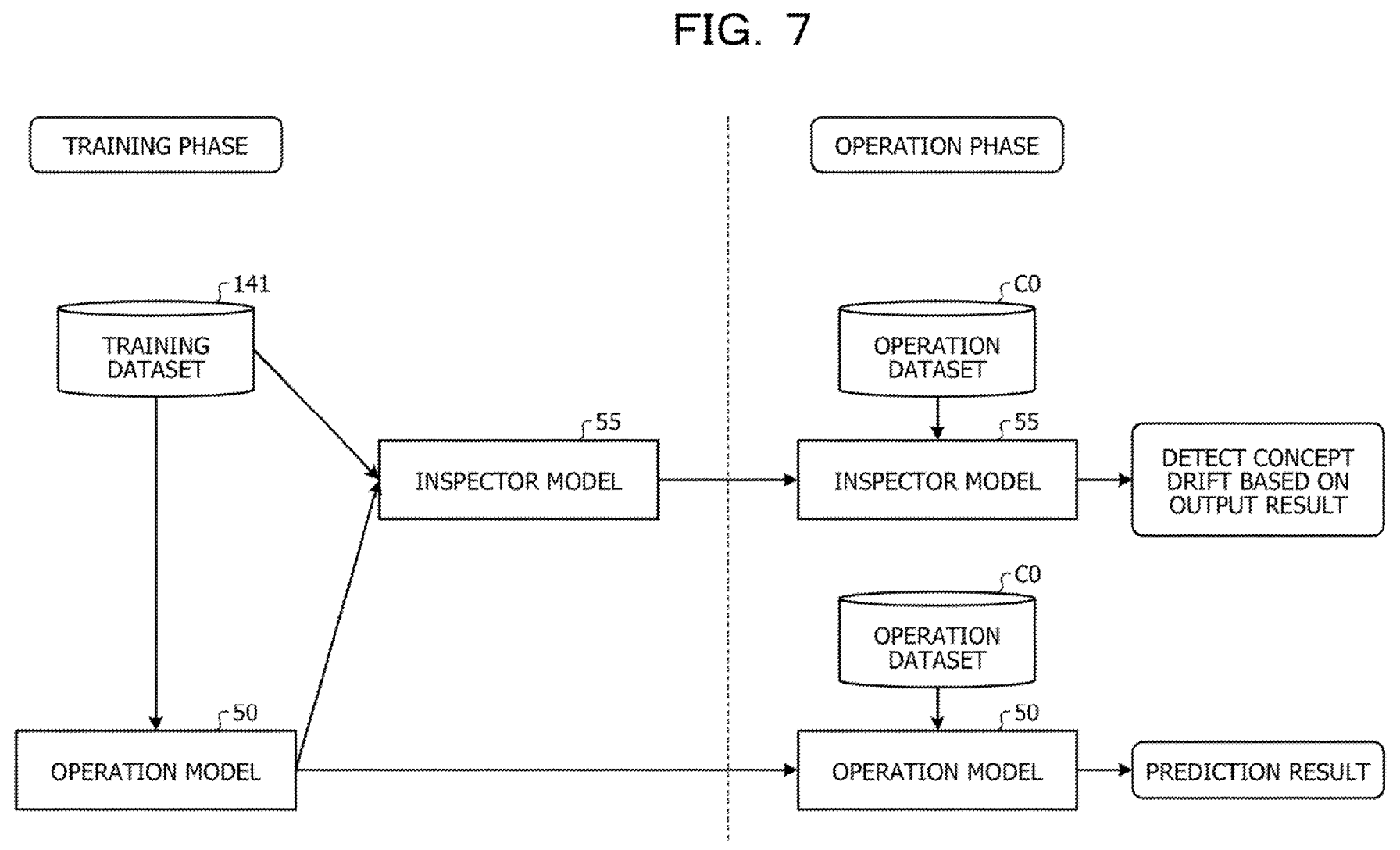

Next, an example of processing of the detection device according to the present embodiment will be described. FIG. 7 is a diagram for explaining the processing of the detection device according to the present embodiment. In FIG. 7, processing of the detection device in a training phase and an operation phase will be described.

The processing in the training phase by the detection device will be described. The detection device executes machine learning of an operation model 50, using a training dataset 141 as an input. The training dataset 141 includes a plurality of pieces of training data, and a correct answer label is assigned to the plurality of pieces of training data. The detection device executes machine learning of an inspector model 55 using an output in a case where the training dataset 141 is input to the operation model 50 on which machine learning has been executed and the training dataset 141 as inputs. For example, the detection device executes machine learning of the inspector model 55 with knowledge distiller (KD).

Figure 8:
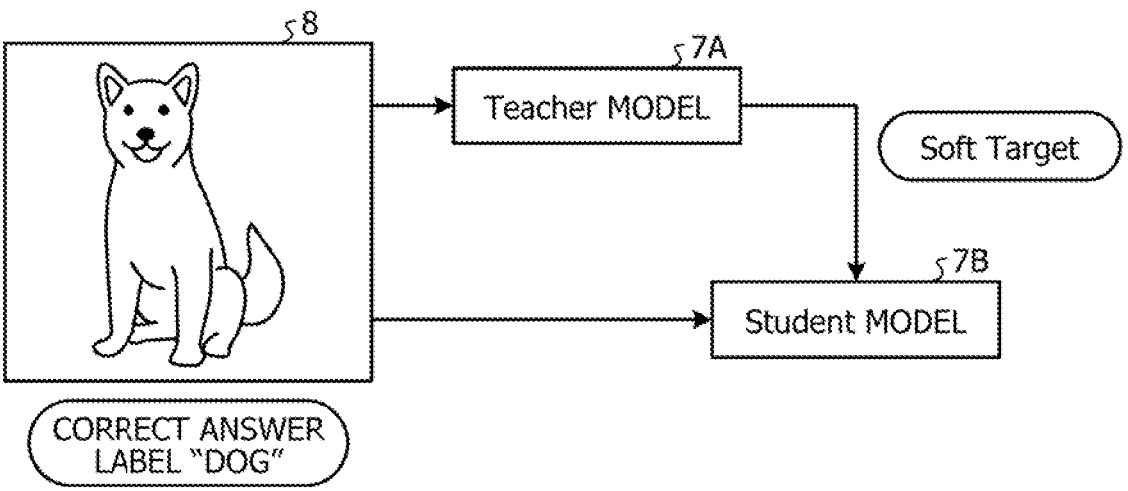
FIG. 8 is a diagram for explaining knowledge distiller.

FIG. 8 is a diagram for explaining the knowledge distiller. The knowledge distiller constructs a Student model 7B that imitates an output value of a Teacher model 7A. The Teacher model 7A corresponds to the operation model 50 in FIG. 7. The Student model 7B corresponds to the inspector model 55 in FIG. 7. For example, it is assumed that training data 6 be given and a correct answer label "dog" be assigned to the training data 6. For convenience of explanation, the Teacher model 7A and the Student model 7B are assumed as neural networks (NN). However, the Teacher model 7A and the Student model 7B are not limited to this.

The detection device trains a parameter of the Teacher model 7A (execute machine learning with backpropagation) so that an output result of the Teacher model 7A when the training data 6 is input approaches the correct answer label "dog". Furthermore, the detection device trains a parameter of the Student model 7B so that an output result of the Student model 7B when the training data 6 is input approaches the output result of the Teacher model 7A when the training data 6 is input. An output of the Teacher model 7A is referred to as a "soft target". The correct answer label of the training data is referred to as a "hard target".

As described above, a method for training the Teacher model 7A using the training data 6 and the hard target and training the Student model 7B using the training data 6 and the soft target is referred to as the knowledge distiller. The detection device trains the Teacher model 7A and the Student model 7B similarly for another piece of training data. For example, the detection device executes machine learning of the inspector model 55, using the training dataset 141 and a soft target output from the operation model 50.

The description returns to FIG. 7. Processing in the operation phase by the detection device will be described. The detection device inputs a plurality of pieces of operation data included in an operation dataset CO into the inspector model 55 and acquires a result output from the inspector model 55. The detection device compares a value calculated based on the result output from the inspector model 55 and a gradient of a loss coefficient of the inspector model 55 with a threshold and detects concept drift.

For example, the value calculated based on the result output from the inspector model 55 and the gradient of the loss coefficient of the inspector model 55 indicates a distance from a decision boundary indicating the boundary of the model application area. In the following description, the value calculated based on the result output from the inspector model 55 and the gradient of the loss coefficient of the inspector model 55 is referred to as an "evaluation value". In a case where the evaluation value is equal to or more than the threshold, this means that the operation dataset input into the inspector model 55 is largely separated from the decision boundary and the concept drift occurs. In a case where the evaluation value is equal to or more than the threshold, the detection device detects the concept drift.

In a case where the drift is not detected, the detection device inputs the operation dataset CO into the operation model 50 and predicts a class to which data of the operation dataset CO belongs. On the other hand, in a case where the drift is detected, the detection device executes the machine learning of the operation model 50 again, with a new training dataset.

As described above, the detection device according to the present embodiment executes machine learning of the inspector model 55 to be the monitoring tool of the operation model 50, using the knowledge distiller. The detection device inputs the operation dataset CO into the inspector model 55, compares the evaluation value calculated based on the result output from the inspector model 55 and the gradient of the loss coefficient of the inspector model 55 with the threshold, and detects the concept drift. As a result, even if the distribution of the data changes in the direction of separating from the decision boundary with time, it is possible to detect the change in the distribution of the data, and accuracy deterioration of the operation model 50 can be detected.

Figure 9:
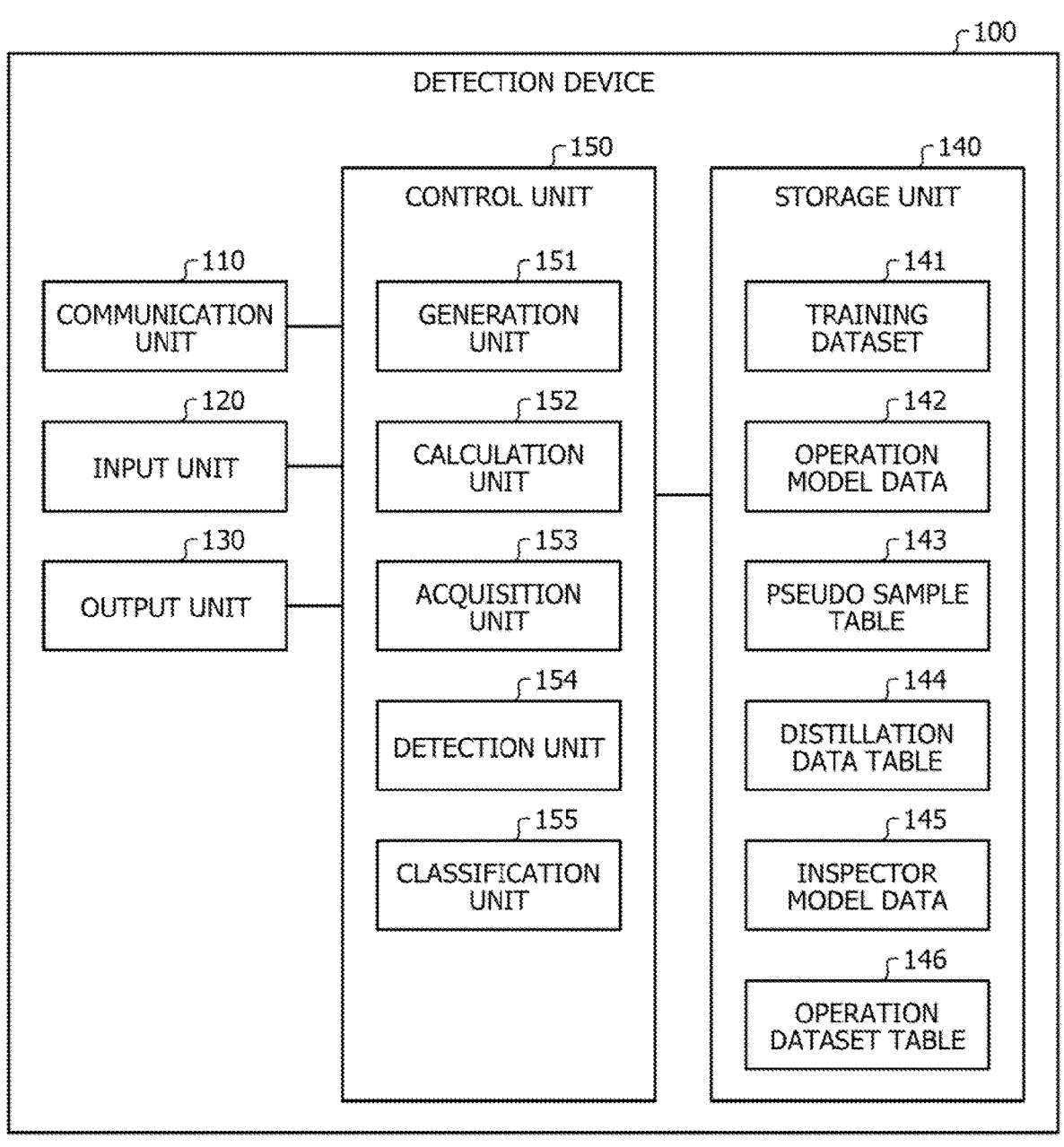
FIG. 9 is a functional block diagram illustrating a configuration of the detection device according to the present embodiment.

Next, an example of a configuration of the detection device according to the present embodiment will be described. FIG. 9 is a functional block diagram illustrating the configuration of the detection device according to the present embodiment. As illustrated in FIG. 9, a detection device 100 includes a communication unit 110, an input unit 120, an output unit 130, a storage unit 140, and a control unit 150.

The communication unit 110 executes data communication with an external device (not illustrated) via a network. For example, the communication unit 110 receives a training dataset 141 or the like, which will be described later, from the external device.

The input unit 120 is a device or an interface that inputs data. For example, the input unit 120 is a mouse, a keyboard, or the like.

The output unit 130 is a display that displays a screen or the like.

The storage unit 140 is an example of a storage device that stores data, a program to be executed by the control unit 150, or the like and is, for example, a hard disk, a memory, or the like. The storage unit 140 includes the training dataset 141, operation model data 142, a pseudo sample table 143, a distillation data table 144, inspector model data 145, an operation dataset table 146.

The training dataset 141 includes a plurality of pieces of training data. FIG. 10 is a diagram illustrating an example of a data structure of the training dataset. As illustrated in FIG. 10, the training dataset associates a record number, training data, and a correct answer label. The record number is a number used to identify a pair of training data and a correct answer label. The training data corresponds to mail spam data, electricity demand forecasts, stock price forecasts, poker hand data, image data, or the like and includes multidimensional feature amounts. The correct answer label is information used to uniquely identify the first class or the second class.

The operation model data 142 is data of the operation model 50 (machine learning model). The operation model 50 according to the present embodiment classifies input data into a plurality of classes with a predetermined classification algorithm. In the present embodiment, description will be made as assuming that the operation model 50 be a NN.

Figure 11:
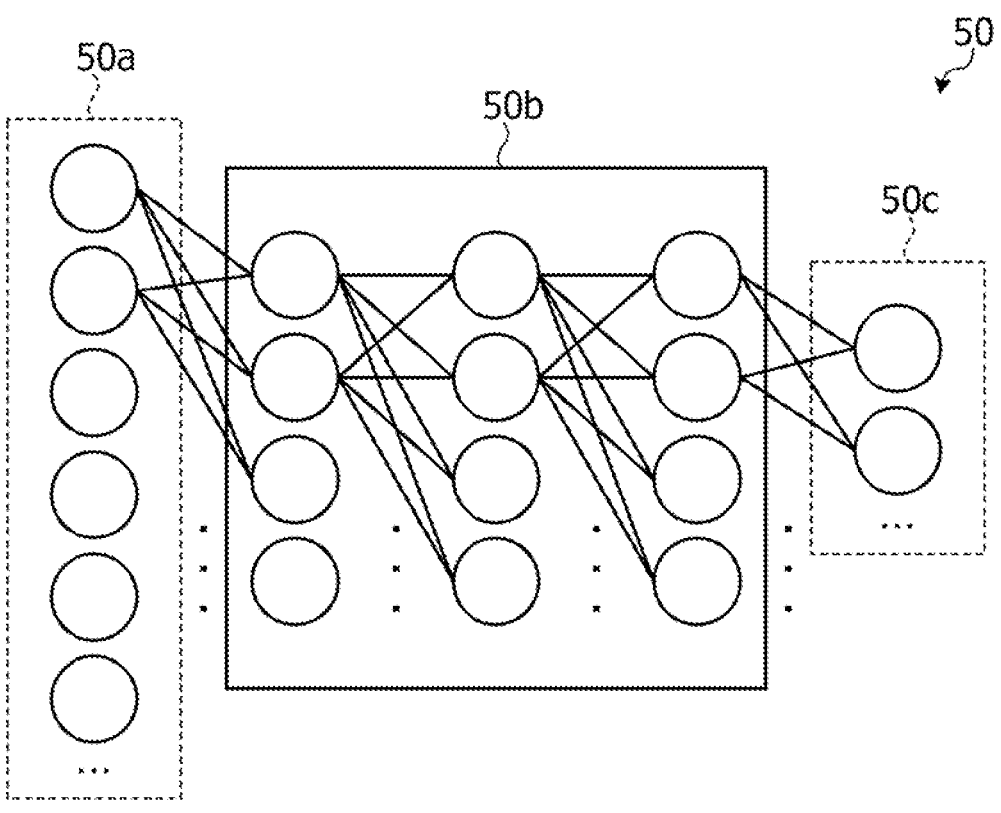
FIG. 11 is a diagram for explaining an example of an operation model.

FIG. 11 is a diagram for explaining an example of the operation model. As illustrated in FIG. 11, the operation model 50 has a structure of a neural network, and includes an input layer 50a, a hidden layer 50b, and an output layer 50c. The input layer 50a, the hidden layer 50b, and the output layer 50c have a structure in which a plurality of nodes is coupled with edges. The hidden layer 50b and the output layer 50c have a function called an activation function and a bias value, and weights are set on the edges. In the following description, the bias value and the weight will be referred to as "parameters".

When data (feature amount of data) is input to each node included in the input layer 50a, a probability of each class is output from the output layer 50c through the hidden layer 50b.

The pseudo sample table 143 holds a plurality of pseudo samples generated based on the training dataset 141. FIG. 12 is a diagram illustrating an example of a data structure of the pseudo sample table. As illustrated in FIG. 12, the pseudo sample table 143 associates a sample number with a pseudo sample. The sample number is information used to identify a pseudo sample. The pseudo sample is data obtained by scaling a feature amount of training data.

The distillation data table 144 stores an output result (soft target) in a case where each pseudo sample of the pseudo sample table 143 is input into the operation model 50. FIG. 13 is a diagram illustrating an example of a data structure of the distillation data table. As illustrated in FIG. 13, the distillation data table 144 associates a sample number, a pseudo sample, and a soft target. Description of the sample number and the pseudo sample is similar to the description of the sample number and the pseudo sample in FIG. 12. The soft target is an output result in a case where the pseudo sample is input into the operation model 50. For example, the soft target is any one of a plurality of classes.

The inspector model data 145 is data of the inspector model 55. Similarly to the operation model 50 described with reference to FIG. 11, the inspector model 55 has a structure of the neural network and includes an input layer, a hidden layer, and an output layer. A parameter is set to the inspector model 55. The parameter of the inspector model 55 is trained with the knowledge distiller.

The operation dataset table 146 includes an operation dataset to be added with time. FIG. 14 is a diagram illustrating an example of a data structure of the operation dataset table. As illustrated in FIG. 14, the operation dataset table 146 includes data identification information and an operation dataset. The data identification information is information used to identify an operation dataset. The operation dataset includes a plurality of pieces of operation data. The operation data corresponds to mail spam data, electricity demand forecasts, stock price forecasts, poker hand data, image data, or the like.

The description returns to FIG. 9. The control unit 150 is a processing unit that controls the entire detection device 100 and includes a generation unit 151, a calculation unit 152, an acquisition unit 153, and a detection unit 154. The control unit 150 is, for example, a processor or the like.

The generation unit 151 executes processing of generating the operation model data 142, processing of generating the pseudo sample table 143, processing of generating the distillation data table 144, and processing of generating the inspector model data 145.

The processing of generating the operation model data 142 by the generation unit 151 will be described. The generation unit 151 executes machine learning of the operation model 50 using the training dataset 141 as an input. For example, in a case where the training data of the training dataset is input to the input layer of the operation model 50, the generation unit 151 trains the parameter of the operation model 50 so that the output result of the output layer approaches a correct answer label of the input training data. For example, the generation unit 151 executes machine learning with backpropagation. The generation unit 151 registers the data (operation model data 142) of the operation model 50 on which machine learning has been executed in the storage unit 140.

Figure 15:
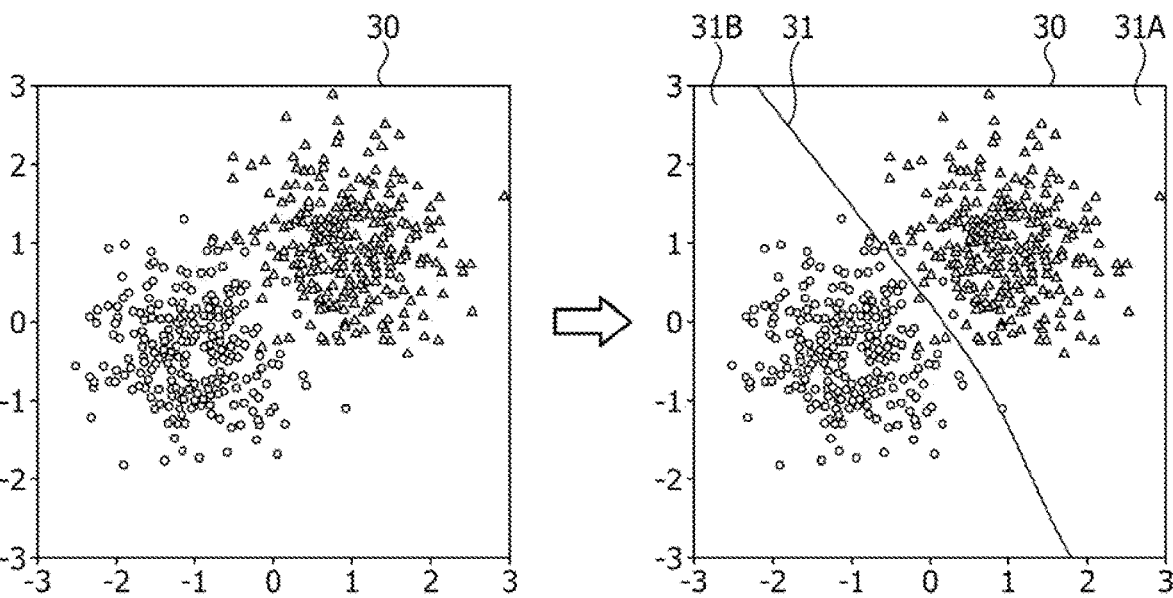
FIG. 15 is a diagram for explaining a decision boundary of a feature space according to the present embodiment.

FIG. 15 is a diagram for explaining a decision boundary of a feature space according to the present embodiment. A feature space 30 is a visualization of each piece of the training data of the training dataset 141. A horizontal axis of the feature space 30 corresponds to an axis of a first feature amount, and a vertical axis corresponds to an axis of a second feature amount. Here, for convenience of explanation, although each piece of the training data is indicated by the two axes, it is assumed that the training data be multi-dimensional data. For example, it is assumed that a correct answer label corresponding to circle-marked training data be the "first class" and a correct answer label corresponding to triangle-marked training data be the "second class".

For example, when the operation model 50 is trained with the training dataset 141, the feature space 30 is classified into model application areas 31A and 31B by a decision boundary 31. For example, in a case where the operation model 50 is a NN, when the operation data is input into the operation model 50, probabilities of the first class and the second class are output. In a case where the probability of the first class is larger than that of the second class, the data is classified into the first class. In a case where the probability of the second class is larger than that of the first class, the data is classified into the second class.

In FIG. 15, a case will be described where the correct answer label of the training data is the "first class" or the "second class". However, a correct answer label of another class may be assigned. In a case where there are n types of classes, n model application areas are set to the feature space 30. In a case where the operation model 50 is the NN, when the operation data is input into the operation model 50, a probability of each class is output.

The processing of generating the pseudo sample table 143 by the generation unit 151 will be described. The generation unit 151 performs data conversion on each piece of the training data included in the training dataset 141. For example, the generation unit 151 performs data conversion (Min-Max Scaling) so that a value of a feature amount of each dimension of the training data is included in values equal to or more than zero and less than one.

The generation unit 151 randomly selects training data of which the value of the feature amount of each dimension is equal to or more than −m and less than 1+m, from among the pieces of training data after data conversion. The reference "m" indicates a margin, and an arbitrary real number is set in advance. The data-converted training data randomly selected by the generation unit 151 through the processing described above is referred to as a "pseudo sample". For example, a range of a value of a feature amount of the pseudo sample is defined by the formula (1). It is assumed that the number of dimensions of the feature amount be n.

[Expression 1]

$$[0,1] \in \mathbb{R}^n \tag{1}$$

The generation unit 151 registers the sample number, the pseudo sample, and the correct answer label in the pseudo sample table 143 in association with each other. A correct answer label of the pseudo sample is assumed to be a correct answer label of training data before data conversion, corresponding to the pseudo sample.

The processing of generating the distillation data table 144 by the generation unit 151 will be described. The generation unit 151 inputs the pseudo sample of the pseudo sample table 143 into the operation model 50 and acquires an output result (soft target) of the operation model 50. The generation unit 151 registers the sample number, the pseudo sample, and the soft target in the distillation data table 144.

The generation unit 151 acquires the soft target by repeatedly executing the processing described above for each pseudo sample in the pseudo sample table 143 and registers the soft target in the distillation data table 144.

For example, when a set of pairs of the pseudo samples and the soft targets registered in the distillation data table 144 is assumed as a pseudo data set, the pseudo data set is defined by the formula (2). A symbol indicated at a position a1 in the formula (2) is referred to as "D hat". A symbol indicated at a position a2 in the formula (2) is referred to as "x hat". The D hat indicates a pseudo data set. The x hat indicates a pseudo sample. The f (x hat) is a soft target output from the operation model 50. A symbol indicated at a position a3 in the formula (2) is referred to as an "ornamental letter X". The ornamental letter X indicates an input space.

[Expression 2]

$$\hat{\mathcal{D}} = \underset{a1}{\left\{ \hat{x}, \underset{a2}{f(\hat{x})} \right\}} \underset{a3}{\left( \forall \hat{x} \in \mathcal{X}; \mathcal{X} \in \mathbb{R}^d \right)} \tag{2}$$

The processing of generating the inspector model data 145 by the generation unit 151 will be described. The generation unit 151 acquires the distillation data table 144 and trains the parameter of the inspector model 55 based on the distillation data table 144. For example, in a case where the pseudo sample of the distillation data table 144 is input into the input layer of the inspector model 55, the generation unit 151 trains the parameter of the inspector model 55 so that the output result of the output layer approaches the soft target. For example, the generation unit 151 executes machine learning with backpropagation. The generation unit 151 registers the data (inspector model data 145) of the inspector model 55, on which machine learning has been executed, in the storage unit 140.

The processing of training the inspector model 55 by the generation unit 151 described above corresponds to training the inspector model 55 so as to minimize a loss function $\theta_2^*$ indicated by the formula (3). In the formula (3), f (X; $\theta_1$) corresponds to an output of the operation model 50, and X corresponds to the D hat. The reference $\theta_1$ indicates the parameter of the operation model 50 that is a trained parameter. The reference g (X; $\theta_2$) corresponds to the output of the inspector model 55, and X corresponds to the D hat. The reference $\theta_2$ indicates the parameter of the inspector model 55 that is a parameter to be trained.

[Expression 3]

$$\theta_2^* = \arg\min_{\theta_2} \mathcal{L}(f(X;\theta_1), g(X;\theta_2)) \qquad (3)$$

In a case of receiving that the drift is detected from the detection unit 154 to be described later, the generation unit 151 executes machine learning of the operation model 50 and the inspector model 55 again. For example, the generation unit 151 acquires the latest training dataset 141 from an external device and trains the operation model 50 and the inspector model 55 again using the latest training dataset 141.

The calculation unit 152 calculates a hyperparameter used to scale the output of the inspector model 55, using a softmax (softmax) with a temperature. An output $g_i$ of the inspector model 55 using the softmax with the temperature in a case where data i is input is defined by the formula (4). In the formula (4), "$z_i$" is an output of the inspector model 55 when the data i is input, and indicates an output of the inspector model 55 using a normal softmax. The reference "T" indicates a hyperparameter. In the following description of the calculation unit 152, the output of the inspector model 55 using the softmax with the temperature is referred to as a score.

[Expression 4]

$$g_i = \frac{\exp\left(z_i/T\right)}{\sum_j \exp\left(z_j/T\right)} \qquad (4)$$

The calculation unit 152 selects a pair of the pseudo samples from the pseudo sample table 143. Here, the pair of the pseudo samples is assumed to include a first pseudo sample and a second pseudo sample. The calculation unit 152 inputs the first pseudo sample into the inspector model 55 using the softmax with the temperature and calculates a first score. The calculation unit 152 inputs the second pseudo sample into the inspector model 55 using the softmax with the temperature and calculates a second score. The calculation unit 152 calculates an absolute value of a difference between the first score and the second score as a score difference.

The calculation unit 152 selects a pair of different pseudo samples from the pseudo sample table 143 and repeatedly executes the processing of calculating the score difference. The calculation unit 152 searches for a hyperparameter such that the maximum score difference, among the plurality of score differences, becomes less than a threshold Ths. The threshold Ths is preset.

Figure 16:
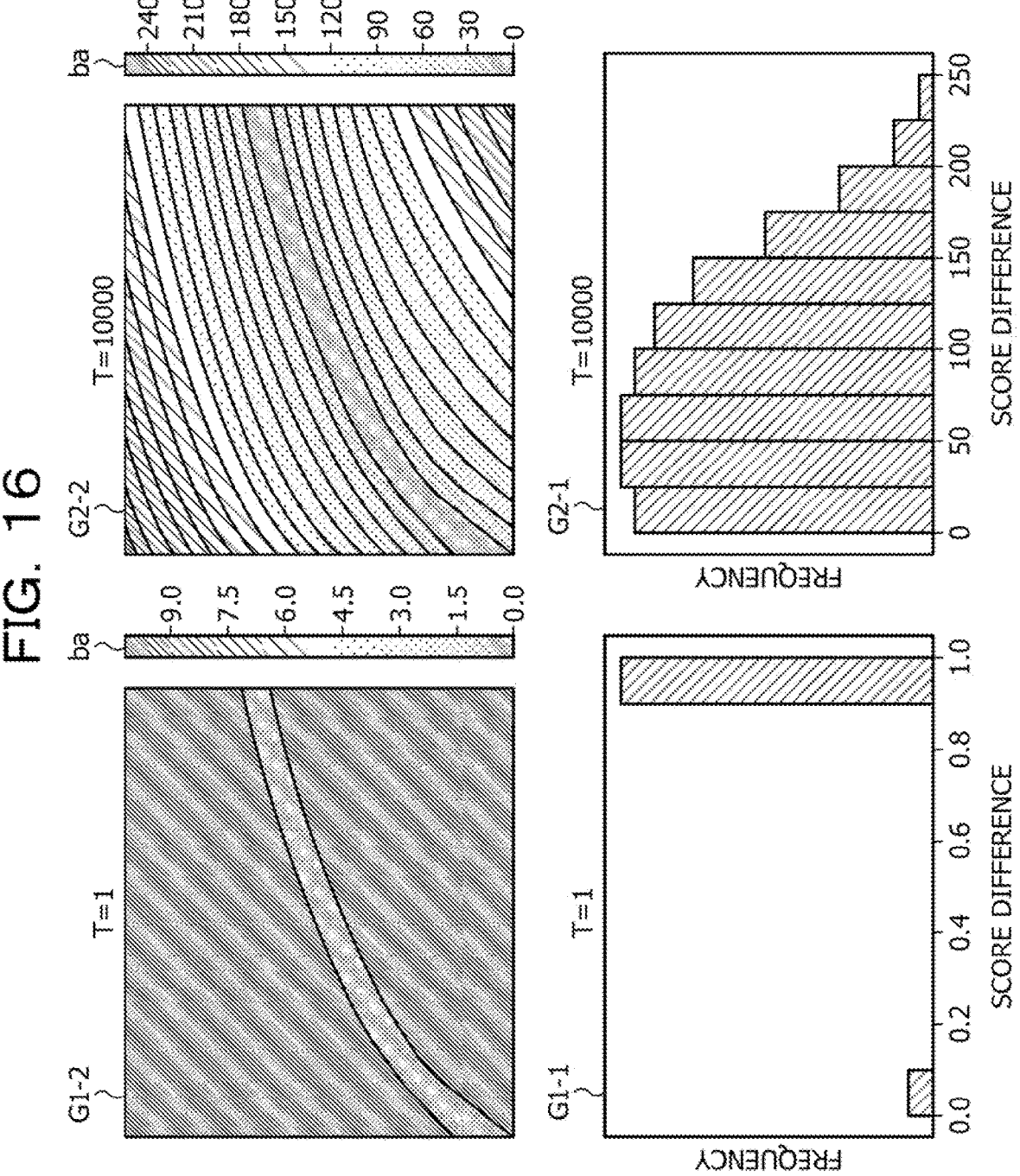
FIG. 16 is a diagram illustrating a distribution of score differences according to a hyperparameter.

FIG. 16 is a diagram illustrating a distribution of score differences according to a hyperparameter. In FIG. 16, a graph G1-1 is a histogram indicating a frequency of a score difference in a case where the hyperparameter is T=1. The horizontal axis of the graph G1-1 corresponds to the score difference, and the vertical axis of the graph G1-1 corresponds to the frequency. In the example illustrated in the graph G1-1, there is a slight frequency at the score differences of zero to 0.1, and the frequencies are concentrated at the score differences 0.9 to 1.0.

A graph G1-2 expresses a distance from the decision boundary with a color in a case where the hyperparameter is T=1. As the color on the graph G1-2 is closer to a color in a lower side of a bar ba, this indicates that the distance from the decision boundary is short. As the color on the graph G1-2 is closer to a color in an upper side of the bar ba, this indicates that the distance from the decision boundary is long. In the graph G1-2, the colors are almost polarized, and the distances from the decision boundary cannot be finely classified.

A graph G2-1 is a histogram indicating a frequency of a score difference in a case where the hyperparameter is T=10000. The horizontal axis of the graph G2-1 corresponds to the score difference, and the vertical axis of the graph G2-1 corresponds to the frequency. In the example illustrated in the graph G2-1, the frequency of the score difference is evenly distributed as compared with the graph G1-1.

A graph G2-2 expresses a distance from the decision boundary with a color in a case where the hyperparameter is T=10000. As the color on the graph G2-2 is closer to the color in the lower side of the bar ba, this indicates that the distance from the decision boundary is short. As the color on the graph G2-2 is closer to the color in the upper side of the bar ba, this indicates that the distance from the decision boundary is long. In the graph G2-2, the distances from the decision boundary can be finely classified as compared with the graph G2-1.

When the calculation unit 152 searches for a hyperparameter with which the maximum score difference is less than the threshold Ths, a relationship between the score difference and the frequency approaches a relationship in the graph G2-1, and the distances from the decision boundary can be finely classified as illustrated in the graph G2-2. The calculation unit 152 outputs information regarding the calculated (searched) hyperparameter to the detection unit 154.

The detection unit 154 inputs the operation data into the inspector model 55, calculates the distance from the decision boundary, and detects a difference between the distribution of the training dataset 141 and the distribution of the operation dataset based on the distance from the decision boundary. The detection unit 154 detects the difference between the distribution of the training dataset 141 and the distribution of the operation dataset as a drift, and outputs that the drift is detected to the generation unit 151.

The distance from the decision boundary can be approximated by the formula (5). A symbol indicated at a position b1 in the formula (5) is simply referred to as "d~".

[Expression 5]

$$\tilde{d}_{g,x,t,\{i,j\}} = \frac{|g_i(x_t) - g_j(x_t)|}{\|\nabla_x g_i(x_t) - \nabla_x g_j(x_t)\|_q} \qquad (5)$$
$$\underset{b1}{\uparrow}$$

It is assumed that the detection unit 154 select operation data i and operation data j to be a pair of pieces of operation data from an operation dataset. In the formula (5), the reference $g_i$ ($x_t$) indicates an output result output from "the inspector model 55 using the softmax with the temperature" by inputting the operation data i. The reference $g_j$ ($x_t$) indicates an output result output from "the inspector model 55 using the softmax with the temperature" by inputting the operation data j.

The reference $\nabla_x g_i$ $(x_t)$ is an output result when the operation data i is input into the differentiated "inspector model 55 using the softmax with the temperature" and corresponds to a gradient of a loss function of the operation data i. The reference $\nabla_x g_i$ $(x_t)$ is an output result when the operation data j is input into the differentiated "inspector model 55 using the softmax with the temperature" and corresponds to a gradient of a loss function of the operation data j.

The denominator of the formula (5) indicates q-norm that is a difference between the gradient of the loss function of the operation data i and the gradient of the loss function of the operation data j. Q-norm is dual-norm of p-norm, and p and q have a relationship in the formula (6). For example, according to the formula (6), if q=1, p=∞, if q=2, p=2, and if q=∞, p=1.

$$1/p+1/q=1 \tag{6}$$

P-norm is indicated by the formula (7).

[Expression 6]

$$\|x\|_p = \sqrt[p]{\sum |x_i|^p} \tag{7}$$

For example, in a case where q=1 is calculated, it is sufficient to calculate p=∞, and the infinity norm is indicated by the formula (8). Note that 1-norm is indicated by the formula (9), and 2-norm is indicated by the formula (10).

[Expression 7]

$$\|x\|_\infty = \max_i |x_i| \tag{8}$$

[Expression 8]

$$\|x\|_1 = \Sigma |x_i| \tag{9}$$

[Expression 9]

$$\|x\|_2 = \sqrt{\Sigma |x_i|^2} \tag{10}$$

The detection unit 154 repeatedly executes processing of selecting a pair of pieces of operation data from the operation dataset again and calculating d⁻ based on the pair of the pieces of operation data that has been selected again and the formula (5). The detection unit 154 calculates an average value of the plurality of calculated d⁻. The average value of the plurality of d⁻ corresponds to the evaluation value described above. In a case where the evaluation value is equal to or more than a threshold thσ, the detection unit 154 detects a difference between the distribution of the training dataset 141 and the distribution of the operation dataset and detects the difference as a drift. The detection unit 154 may notify the external device of that the drift is detected.

In a case where the plurality of operation datasets is registered in the operation dataset table 146, the detection unit 154 repeatedly executes the processing described above for each operation dataset.

By the way, the detection unit 154 calculates the threshold thσ by executing the following processing. The detection unit 154 repeatedly executes processing of selecting a pair of pseudo samples from the pseudo sample table 143 and calculating d⁻ based on the selected pair of the pseudo samples and the formula (5). The detection unit 154 calculates a standard deviation of d⁻ based on the plurality of calculated d⁻ and sets the calculated standard deviation as the threshold Thσ described above.

A classification unit 155 specifies a class to which operation data belongs, by inputting the operation data of the operation dataset into the operation model 50. The classification unit 155 repeatedly executes the processing described above on another piece of the operation data of the operation dataset so as to classify the plurality of pieces of operation data into a plurality of classes.

Figure 17:
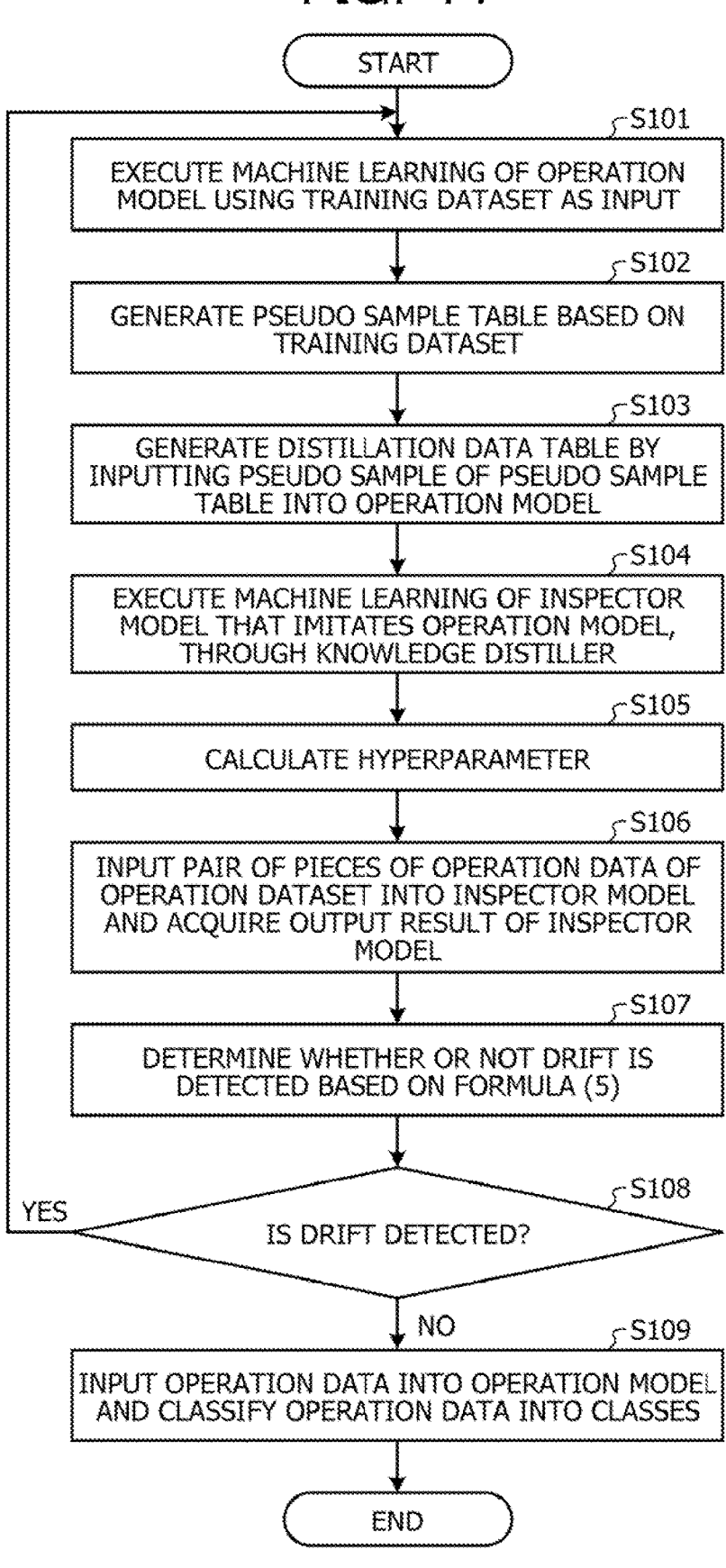
FIG. 17 is a flowchart illustrating a processing procedure of the detection device according to the present embodiment.

Next, an example of a processing procedure of the detection device 100 according to the present embodiment will be described. FIG. 17 is a flowchart illustrating the processing procedure of the detection device according to the present embodiment. For example, each time when a new operation dataset is registered in the operation dataset table 146, the detection device 100 repeatedly executes the processing in FIG. 17.

As illustrated in FIG. 17, the generation unit 151 of the detection device 100 executes machine learning of an operation model using the training dataset 141 as an input (step S101).

The generation unit 151 generates the pseudo sample table 143 based on the training dataset 141 (step S102). The generation unit 151 generates the distillation data table 144 by inputting a pseudo sample of the pseudo sample table 143 into the operation model (step S103).

The generation unit 151 executes machine learning of the inspector model 55 that imitates the operation model 50, through the knowledge distiller (step S104). The calculation unit 152 of the detection device 100 calculates a hyperparameter of the inspector model 55 (step S105).

The acquisition unit 153 of the detection device 100 inputs the pair of pieces of the operation data of the operation dataset into the inspector model 55 and acquires an output result of the inspector model (step S106). The detection unit 154 of the detection device 100 determines whether or not a drift is detected, based on the formula (5) (step S107).

In a case where the drift is detected (Yes in step S108), the detection unit 154 proceeds the procedure to step S101. In a case where the drift is not detected (No in step S108), the detection unit 154 proceeds the procedure to step S109. The classification unit 155 of the detection device 100 inputs the operation data into the operation model 50 and classifies the operation data into classes (step S109).

Next, an effect of the detection device 100 according to the present embodiment will be described. The detection device 100 executes machine learning of the inspector model 55 to be the monitoring tool of the operation model 50, using the knowledge distiller. The detection device 100 inputs the operation dataset into the inspector model 55, compares the evaluation value calculated based on the result output from the inspector model 55 and the gradient of the loss coefficient of the inspector model 55 with the threshold, and detects the concept drift. As a result, even if the distribution of the data changes in the direction of separating from the decision boundary with time, it is possible to detect the change in the distribution of the data, and accuracy deterioration of the operation model 50 can be detected.

The detection device 100 repeatedly executes processing of selecting a pair of different pseudo samples and calculating a score difference. The detection device 100 calculates a hyperparameter so that the maximum score difference, among the plurality of score differences, becomes less than the threshold Ths. As a result, the distance from the decision boundary can be quantified in a stepwise manner.

The detection device 100 calculates the evaluation value based on the formula (5), compares the evaluation value with the threshold Thσ, and detects a change in the distribution of the data. Furthermore, the detection device 100 calculates the threshold Thσ, using the training dataset. As a result, it is possible to accuracy detect the drift.

In a case where the drift is not detected, the detection device 100 inputs the operation data of the operation dataset into the operation model 50 and classes the operation data into the plurality of classes. Therefore, the operation model 50 before the drift is generated can appropriately classify the operation data into the plurality of classes.

In a case where the drift is detected, the detection device 100 executes machine learning of the operation model again, with a new training dataset. As a result, it is possible to generate the operation model 50 corresponding to the drift again.

Figure 18:
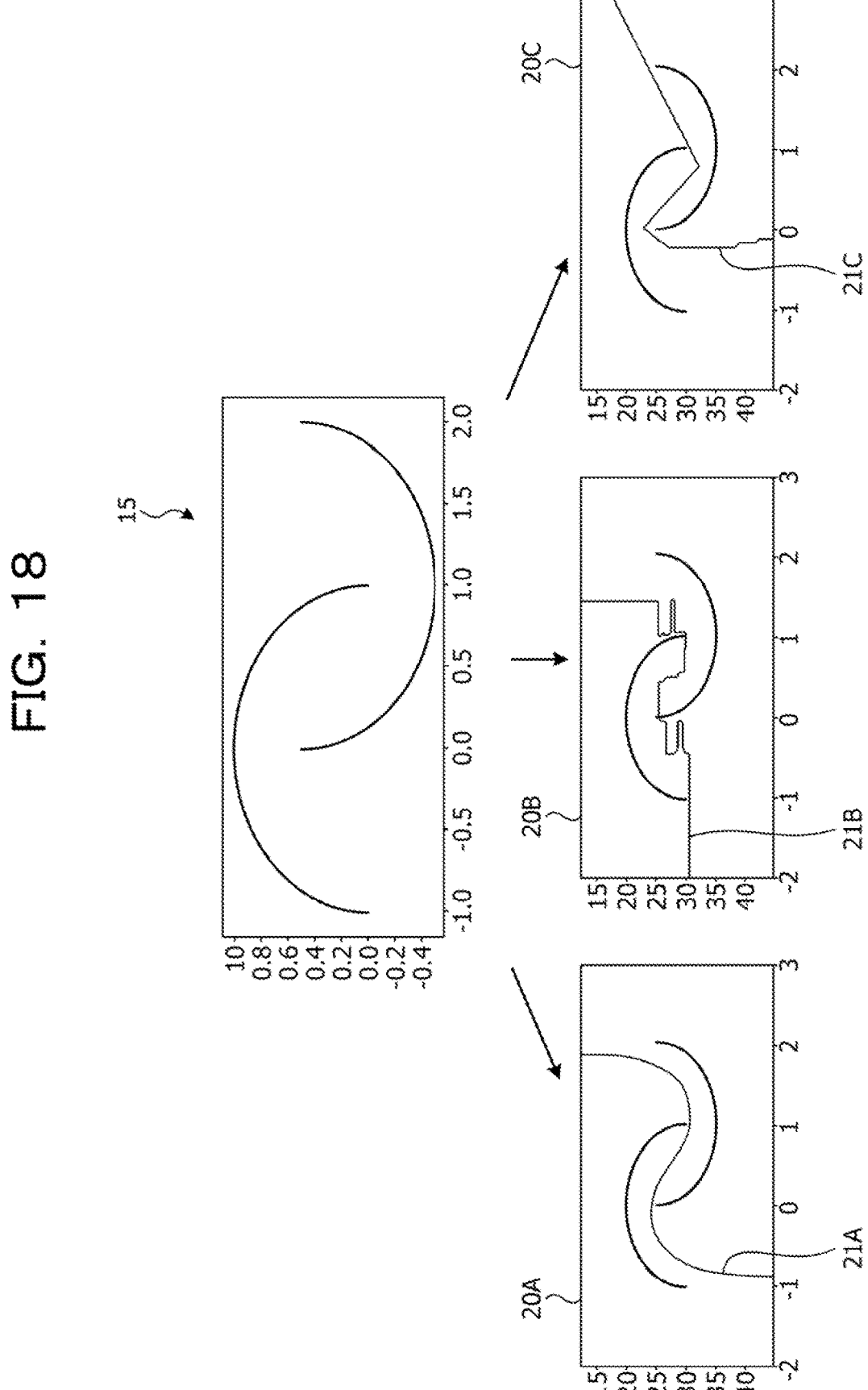
FIG. 18 is a diagram (1) illustrating properties of a decision boundary of each machine learning model.

Subsequently, properties of a decision boundary in a case where the same training dataset is input to each of a plurality of types of machine learning models will be described. FIG. 18 is a diagram (1) illustrating the properties of the decision boundary of each machine learning model. In the example illustrated in FIG. 18, an example is illustrated where machine learning is executed on each of a support vector machine (Soft-Margin SVM), a random forest (Random Forest), and a NN, using one training dataset 15.

Then, a distribution in a case where a dataset is input to the trained support vector machine is a distribution 20A, and each piece of the data is classified into the first class and the second class with a decision boundary 21A. A distribution in a case where a dataset is input to the trained random forest is a distribution 20B, and each piece of the data is classified into the first class and the second class with a decision boundary 21B. A distribution in a case where a dataset is input to the trained NN is a distribution 20C, and each piece of the data is classified into the first class and the second class with a decision boundary 21C.

As illustrated in FIG. 18, it is found that, even in a case where the training is performed using the same training dataset, the properties of the decision boundary are different depending on the type of the machine learning model.

Figure 19:
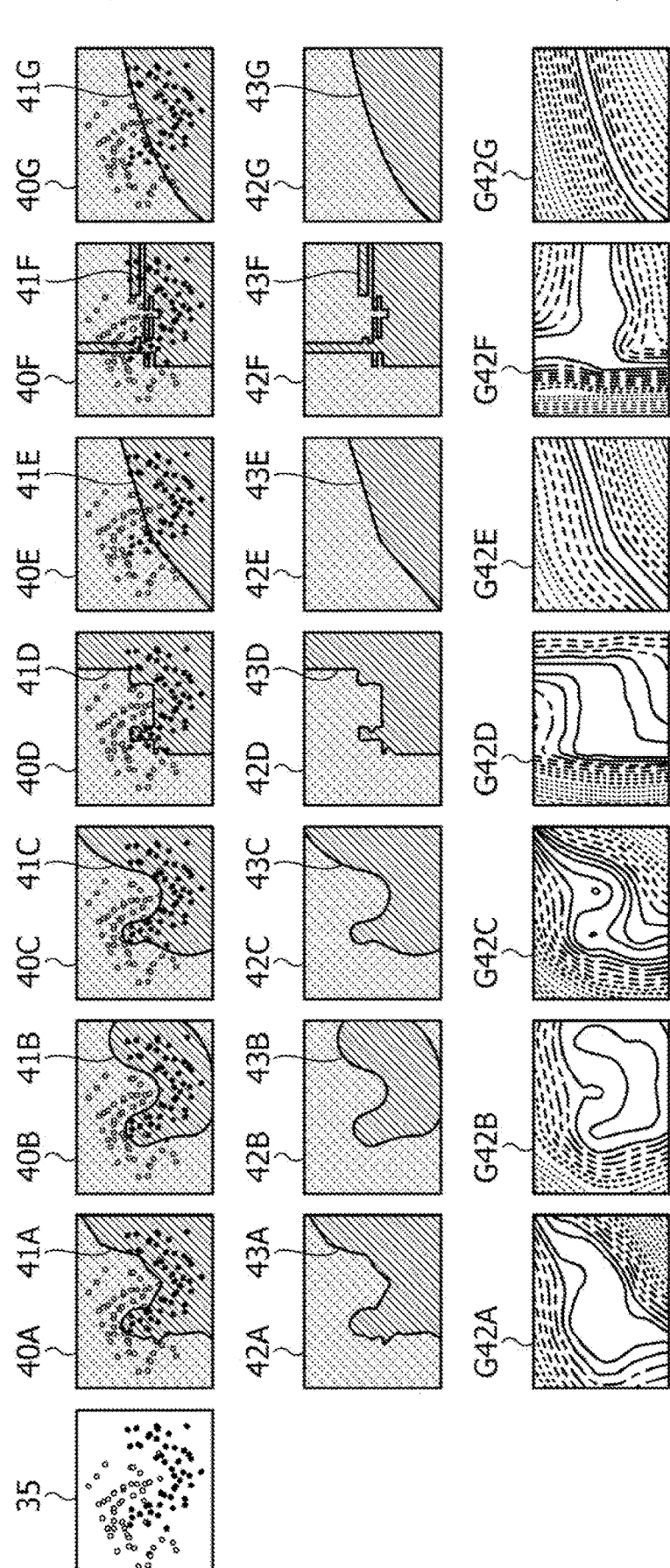
FIG. 19 is a diagram (2) illustrating the properties of the decision boundary of each machine learning model.

FIG. 19 is a diagram (2) illustrating the properties of the decision boundary of each machine learning model. In FIG. 19, an example is illustrated in which a plurality of types of machine learning models is trained, using one training dataset 35. Here, as the machine learning model, Nearest Neighbors, RBF SVM, Gaussian Process, Random Forest, Neural Net, Gradient Booting Tree, and Naive Bayes are indicated.

A distribution in a case where a dataset is input to the trained Nearest Neighbors is a distribution 40A. Each piece of the data is classified into the first class and the second class with a decision boundary 41A. A distribution of an inspector model of the trained Nearest Neighbors is a distribution 42A, and each piece of the data is classified into the first class and the second class with a decision boundary 43A. G42A indicates a distance from a decision boundary calculated based on the inspector model of the trained Nearest Neighbors. In G42A, contour lines of the same color indicate the same distance. It is assumed that the inspector model be a NN.

A distribution in a case where a dataset is input to the trained RBF SVM is a distribution 40B. Each piece of the data is classified into the first class and the second class with a decision boundary 41B. A distribution of an inspector model of the trained RBF SVM is a distribution 42B, and each piece of the data is classified into the first class and the second class with a decision boundary 43B. G42B indicates a distance from a decision boundary calculated based on the inspector model of the trained RBF SVM. It is assumed that the inspector model be a NN.

A distribution in a case where a dataset is input to the trained Gaussian Process is a distribution 40C. Each piece of the data is classified into the first class and the second class with a decision boundary 41C. A distribution of an inspector model of the trained Gaussian Process is a distribution 42C, and each piece of the data is classified into the first class and the second class with a decision boundary 43C. G42C indicates a distance from a decision boundary calculated based on the inspector model of the trained Gaussian Process. It is assumed that the inspector model be a NN.

A distribution in a case where a dataset is input to the trained Random Forest is a distribution 40D. Each piece of the data is classified into the first class and the second class with a decision boundary 41D. A distribution of an inspector model of the trained Random Forest is a distribution 42D, and each piece of the data is classified into the first class and the second class with a decision boundary 43D. G42D indicates a distance from a decision boundary calculated based on the inspector model of the trained Random Forest. It is assumed that the inspector model be a NN.

A distribution in a case where a dataset is input to the trained Neural Net is a distribution 40E. Each piece of the data is classified into the first class and the second class with a decision boundary 41E. A distribution of an inspector model of the trained Neural Net is a distribution 42E, and each piece of the data is classified into the first class and the second class with a decision boundary 43E. G42E indicates a distance from a decision boundary calculated based on the inspector model of the trained Neural Net. It is assumed that the inspector model be a NN.

A distribution in a case where a dataset is input to the trained Gradient Booting Tree is a distribution 40F. Each piece of the data is classified into the first class and the second class with a decision boundary 41F. A distribution of an inspector model of the trained Gradient Booting Tree is a distribution 42F, and each piece of the data is classified into the first class and the second class with a decision boundary 43F. G42F indicates a distance from a decision boundary calculated based on the inspector model of the trained Gradient Booting Tree. It is assumed that the inspector model be a NN.

A distribution in a case where a dataset is input to the trained Naive Bayes is a distribution 40G. Each piece of the data is classified into the first class and the second class with a decision boundary 41G. A distribution of an inspector model of the trained Naive Bayes is a distribution 42G, and each piece of the data is classified into the first class and the second class with a decision boundary 43G. G42G indicates a distance from a decision boundary calculated based on the inspector model of the trained Naive Bayes. It is assumed that the inspector model be a NN.

The detection device 100 according to the present embodiment can perform approximately calculation on a distance from a decision boundary, using an inspector model, regardless of an architecture of a machine learning model.

Figure 20:
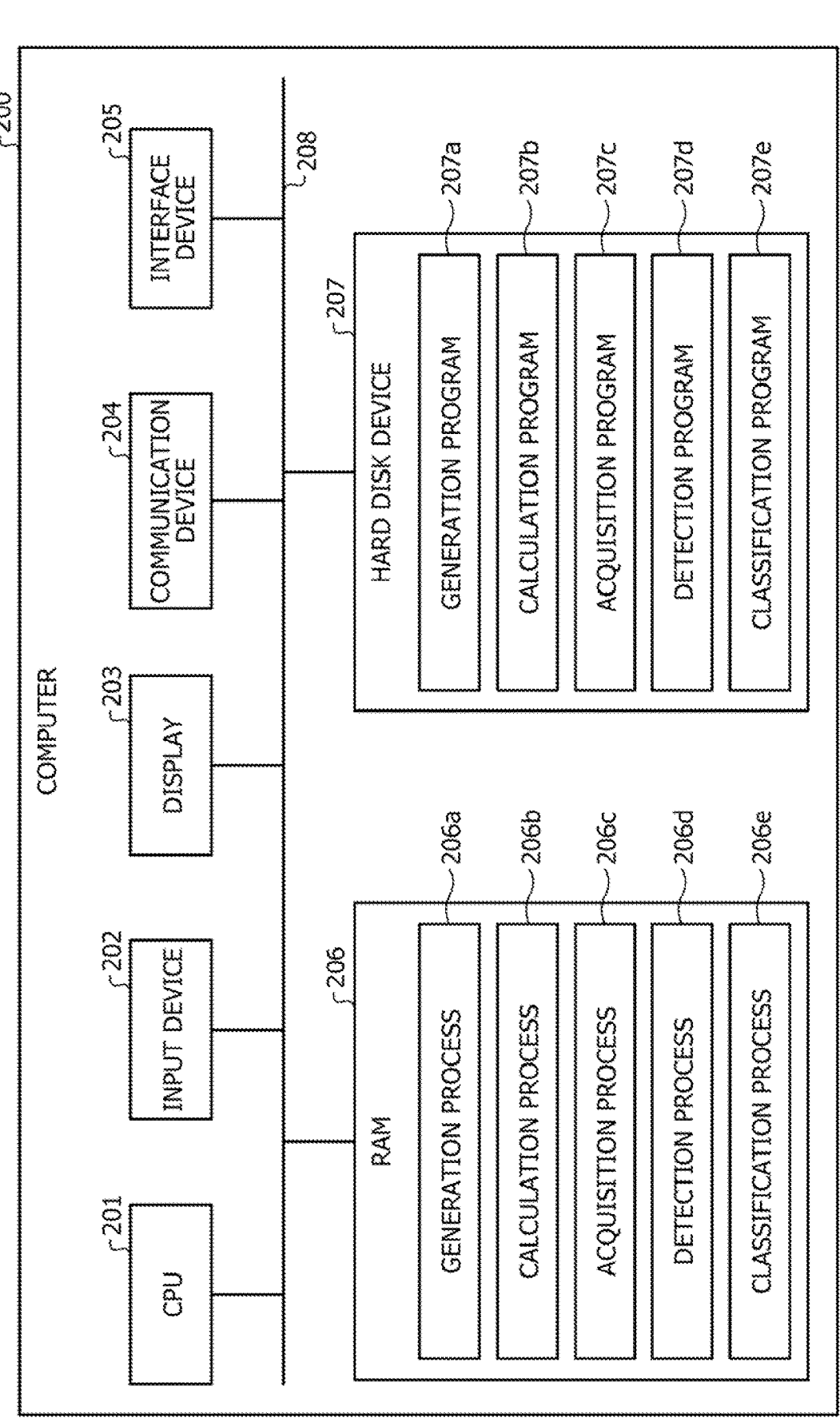
FIG. 20 is a diagram illustrating an example of a hardware configuration of a computer that implements functions similar to those of the detection device according to the present embodiment.

Next, an example of a hardware configuration of a computer that implements functions similar to those of the detection device 100 according to the present embodiment will be described. FIG. 20 is a diagram illustrating an example of the hardware configuration of the computer that implements the functions similar to those of the detection device according to the present embodiment.

As illustrated in FIG. 20, a computer 200 includes a central processing unit (CPU) 201 that executes various types of arithmetic processing, an input device 202 that accepts data input from a user, and a display 203. Furthermore, the computer 200 also includes a reading device 204 that reads a program or the like from a storage medium, and an interface device 205 that exchanges data with an external device or the like via a wired or wireless network. The computer 200 includes a random access memory (RAM) 206 that temporarily stores various types of information, and a hard disk device 207. Then, each of the devices 201 to 207 is coupled to a bus 208.

The hard disk device 207 includes a generation program 207*a*, a calculation program 207*b*, an acquisition program 207*c*, a detection program 207*d*, and a classification program 207*e*. The CPU 201 reads the generation program 207*a*, the calculation program 207*b*, the acquisition program 207*c*, the detection program 207*d*, and the classification program 207*e* and develops the programs on the RAM 206.

The generation program 207*a* functions as a generation process 206*a*. The calculation program 207*b* functions as a calculation process 206*b*. The acquisition program 207*c* functions as an acquisition process 206*c*. The detection program 207*d* functions as a detection process 206*d*. The classification program 207*e* functions as a classification process 206*e*.

Processing of the generation process 206*a* corresponds to the processing of the generation unit 151. Processing of the calculation process 206*b* corresponds to the processing of the calculation unit 152. Processing of the acquisition process 206*c* corresponds to the processing of the acquisition unit 153. Processing of the detection process 206*d* corresponds to the processing of the detection unit 154. Processing of the classification process 206*e* corresponds to the processing of the classification unit 155.

Note that the individual programs 207*a* to 207*e* may not necessarily be stored in the hard disk device 207 beforehand. For example, each of the programs is stored in a "portable physical medium" to be inserted in the computer 200, such as a flexible disk (FD), a compact disc read only memory (CD-ROM), a digital versatile disc (DVD) disk, a magneto-optical disk, or an integrated circuit (IC) card. Then, the computer 200 may read and execute each of the programs 207*a* to 207*e*.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a detection program for causing a computer to execute processing comprising:

inputting a plurality of pieces of second data into a second machine learning model generated by machine learning based on a plurality of pieces of first data and a first result output from a first machine learning model according to an input of the plurality of pieces of first data;

acquiring a second result output from the second machine learning model according to the input of the plurality of pieces of second data; and detecting a difference between a distribution of the plurality of pieces of first data and a distribution of the plurality of pieces of second data, based on comparison between a value calculated based on the second result and a gradient of a loss function of the second machine learning model with a threshold.

2. The non-transitory computer-readable recording medium according to claim 1, for causing the computer to execute processing further comprising:

by selecting first pair data to be a data pair from among the plurality of pieces of first data and inputting each piece of the first pair data into the second machine learning model, calculating a score difference of the first pair data, and calculating a hyperparameter that adjusts an output of the second machine learning model so that the score difference is less than a predetermined score value.

3. The non-transitory computer-readable recording medium according to claim 2, wherein by selecting second pair data to be a data pair from among the plurality of pieces of second data and inputting each piece of the second pair data into the second machine learning model, the acquiring the second result calculates a score difference of data of the second pair data, and the detecting detects the difference between the distribution of the plurality of pieces of first data and the distribution of the plurality of pieces of second data based on a value obtained by dividing the score difference of the second pair data by a gradient of a loss function regarding the second pair data and a threshold.

4. The non-transitory computer-readable recording medium according to claim 3, for causing the computer to execute processing further comprising: repeatedly executing processing of calculating a score difference of data of the second pair data by selecting the first pair data to be the data pair from among the plurality of pieces of first data and inputting each piece of the data of the first pair data into the second machine learning model and of calculating a value obtained by dividing the score difference of the first pair data by a gradient of a loss function regarding the first pair data, and calculating the threshold based on the plurality of calculated values.

5. The non-transitory computer-readable recording medium according to claim 1, for causing the computer to execute processing further comprising: inputting the plurality of pieces of second data into the first machine learning model in a case where the difference is not detected by the detecting, and classifying the plurality of pieces of second data.

6. The non-transitory computer-readable recording medium according to claim 1, for causing the computer to execute processing further comprising: executing machine learning on the first machine learning model again in a case where the difference is detected by the detecting.

7. A detection method comprising:

inputting a plurality of pieces of second data into a second machine learning model generated by machine learning based on a plurality of pieces of first data and a first result output from a first machine learning model according to an input of the plurality of pieces of first data;

acquiring a second result output from the second machine learning model according to the input of the plurality of pieces of second data; and detecting a difference between a distribution of the plurality of pieces of first data and a distribution of the plurality of pieces of second data, based on comparison between a value calculated based on the second result and a gradient of a loss function of the second machine learning model with a threshold.

8. The detection method according to claim 7, further comprising:

by selecting first pair data to be a data pair from among the plurality of pieces of first data and inputting each piece of the first pair data into the second machine learning model, calculating a score difference of the first pair data, and calculating a hyperparameter that adjusts an output of the second machine learning model so that the score difference is less than a predetermined score value.

9. The detection method according to claim 8, wherein by selecting second pair data to be a data pair from among the plurality of pieces of second data and inputting each piece of the second pair data into the second machine learning model, the acquiring the second result calculates a score difference of data of the second pair data, and the detecting detects the difference between the distribution of the plurality of pieces of first data and the distribution of the plurality of pieces of second data based on a value obtained by dividing the score difference of the second pair data by a gradient of a loss function regarding the second pair data and a threshold.

10. The detection method according to claim 9, further comprising: repeatedly executing processing of calculating a score difference of data of the second pair data by selecting the first pair data to be the data pair from among the plurality of pieces of first data and inputting each piece of the data of the first pair data into the second machine learning model and of calculating a value obtained by dividing the score difference of the first pair data by a gradient of a loss function regarding the first pair data, and calculating the threshold based on the plurality of calculated values.

11. The detection method according to claim 7, further comprising: inputting the plurality of pieces of second data into the first machine learning model in a case where the difference is not detected by the detecting, and classifying the plurality of pieces of second data.

12. The detection method according to claim 7, further comprising: executing machine learning on the first machine learning model again in a case where the difference is detected by the detecting.

13. A detection device comprising:

a memory; and a processor coupled to the memory and configured to:

input a plurality of pieces of second data into a second machine learning model generated by machine learning based on a plurality of pieces of first data and a first result output from a first machine learning model according to an input of the plurality of pieces of first data;

acquire a second result output from the second machine learning model according to the input of the plurality of pieces of second data; and detect a difference between a distribution of the plurality of pieces of first data and a distribution of the plurality of pieces of second data, based on comparison between a value calculated based on the second result and a gradient of a loss function of the second machine learning model with a threshold.

14. The detection device according to claim 13, wherein the processor:

by selecting first pair data to be a data pair from among the plurality of pieces of first data and inputting each piece of the first pair data into the second machine learning model, calculates a score difference of the first pair data, and calculates a hyperparameter that adjusts an output of the second machine learning model so that the score difference is less than a predetermined score value.

15. The detection device according to claim 14, wherein the processor: by selecting second pair data to be a data pair from among the plurality of pieces of second data and inputting each piece of the second pair data into the second machine learning model, calculates a score difference of data of the second pair data, and detects the difference between the distribution of the plurality of pieces of first data and the distribution of the plurality of pieces of second data based on a value obtained by dividing the score difference of the second pair data by a gradient of a loss function regarding the second pair data and a threshold.

16. The detection device according to claim 15, wherein the processor: repeatedly executes processing of calculating a score difference of data of the second pair data by selecting the first pair data to be the data pair from among the plurality of pieces of first data and inputting each piece of the data of the first pair data into the second machine learning model and of calculating a value obtained by dividing the score difference of the first pair data by a gradient of a loss function regarding the first pair data, and calculates the threshold based on the plurality of calculated values.

17. The detection device according to claim 13, wherein the processor: inputs the plurality of pieces of second data into the first machine learning model in a case where the difference is not detected by the detecting, and classifies the plurality of pieces of second data.

18. The detection device according to claim 13, wherein the processor: executes machine learning on the first machine learning model again in a case where the difference is detected by the detecting.

\* \* \* \* \*